March 5, 1957  E. W. GOLDBERG  2,783,680
SLIDE AND FILM PROJECTOR WITH SWING-AWAY HEAD
Filed Jan. 29, 1951  6 Sheets-Sheet 1

INVENTOR.
Ernest W. Goldberg
BY
Attorney

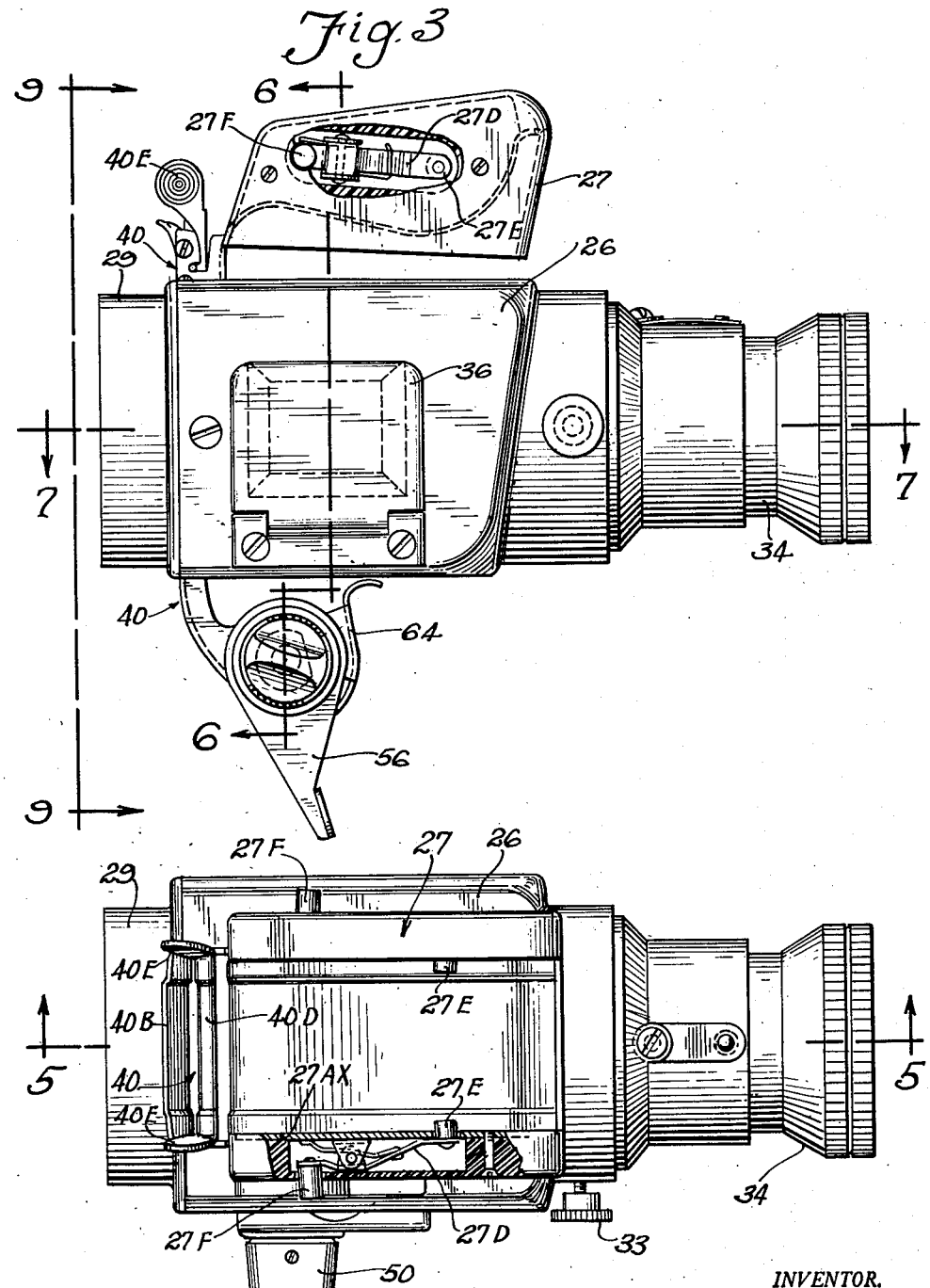

March 5, 1957 E. W. GOLDBERG 2,783,680
SLIDE AND FILM PROJECTOR WITH SWING-AWAY HEAD
Filed Jan. 29, 1951 6 Sheets-Sheet 3
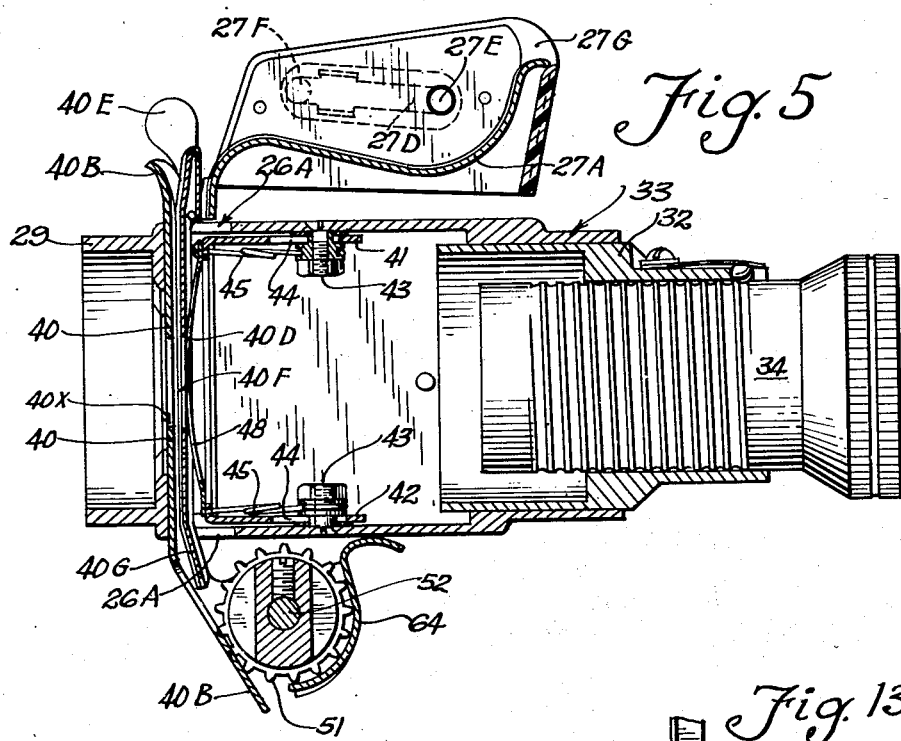
Fig. 5
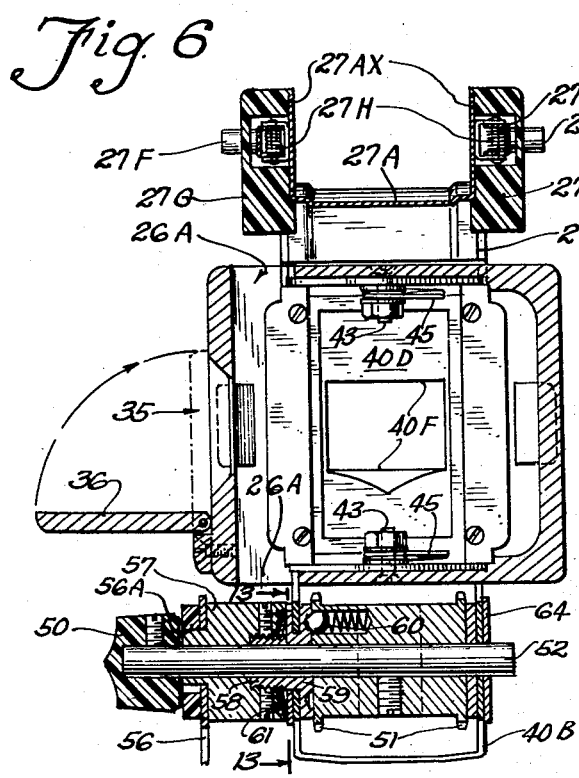
Fig. 6
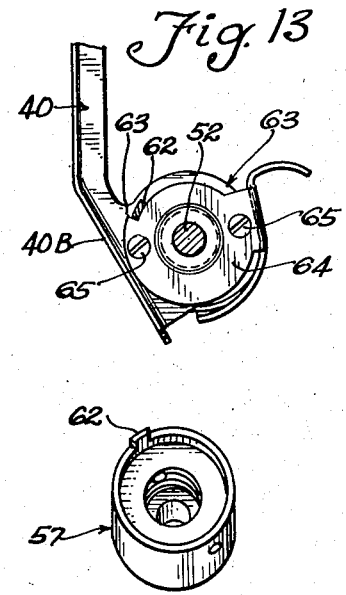
Fig. 13
Fig. 14
INVENTOR.
Ernest W. Goldberg
BY
Attorney March 5, 1957 E. W. GOLDBERG 2,783,680
SLIDE AND FILM PROJECTOR WITH SWING-AWAY HEAD
Filed Jan. 29, 1951 6 Sheets-Sheet 4
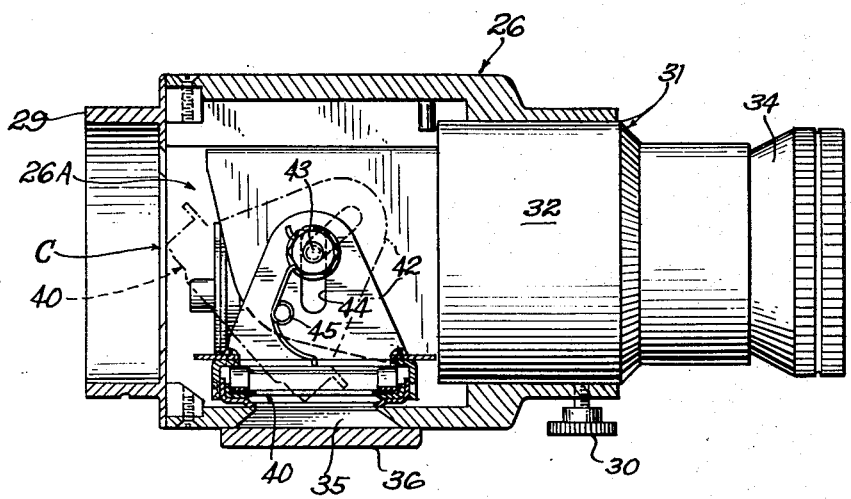
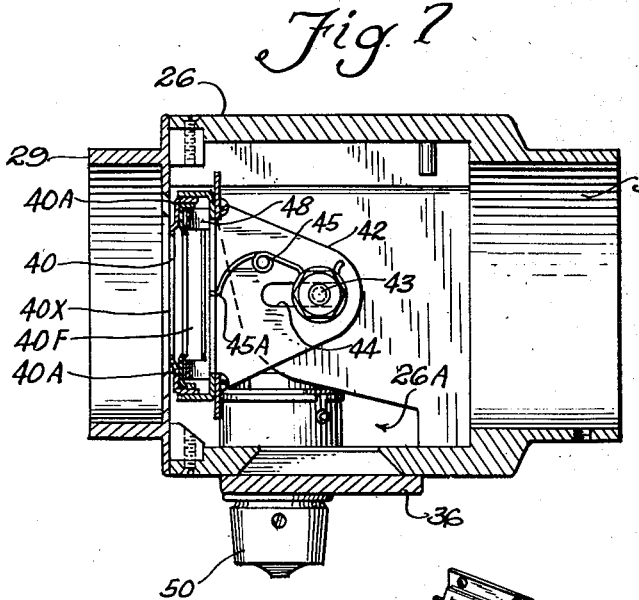
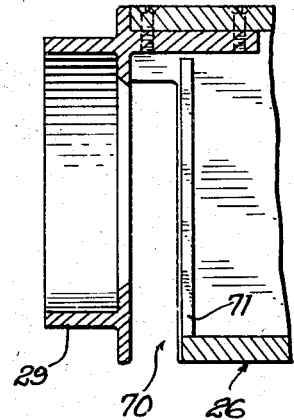
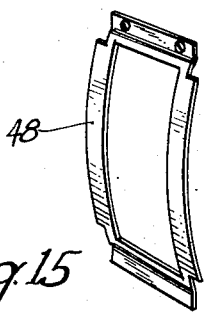
INVENTOR.
Ernest W. Goldberg
Attorney

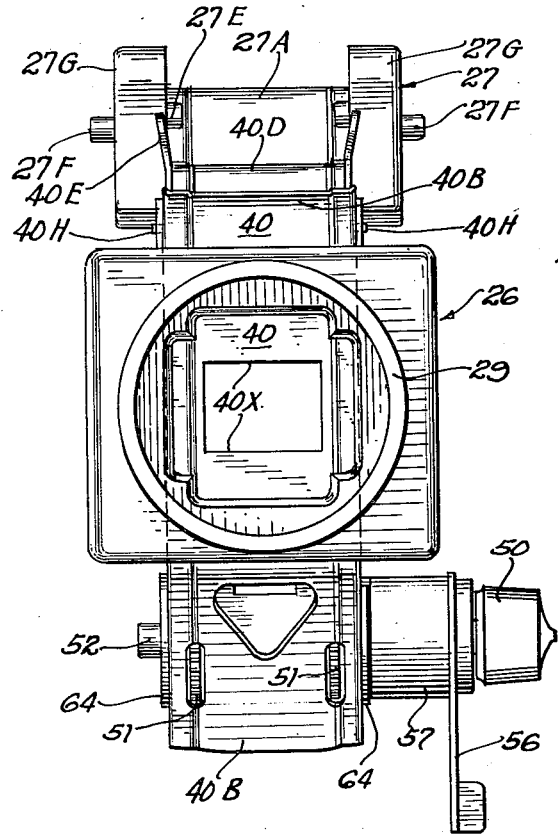
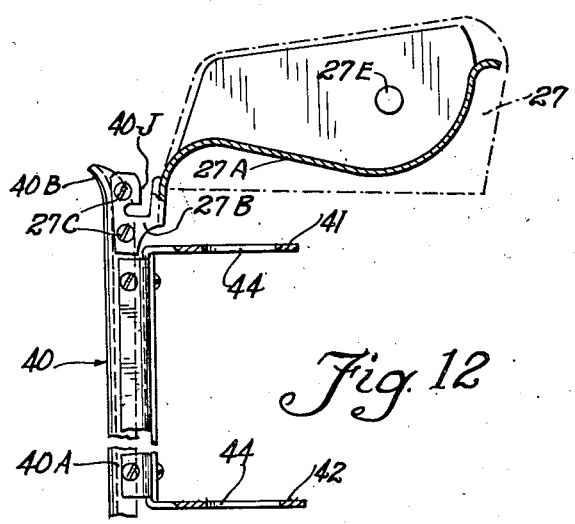
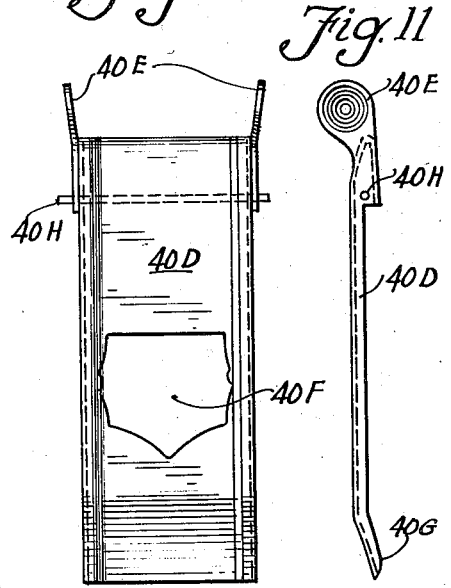
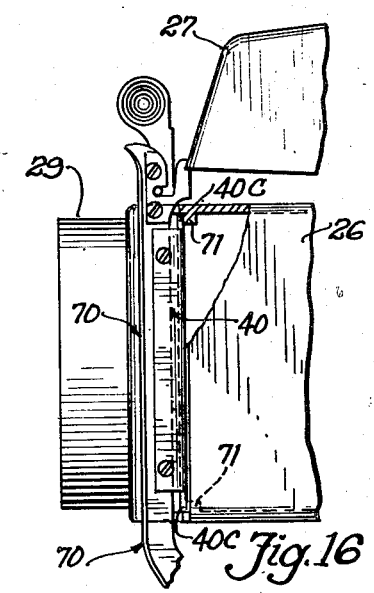

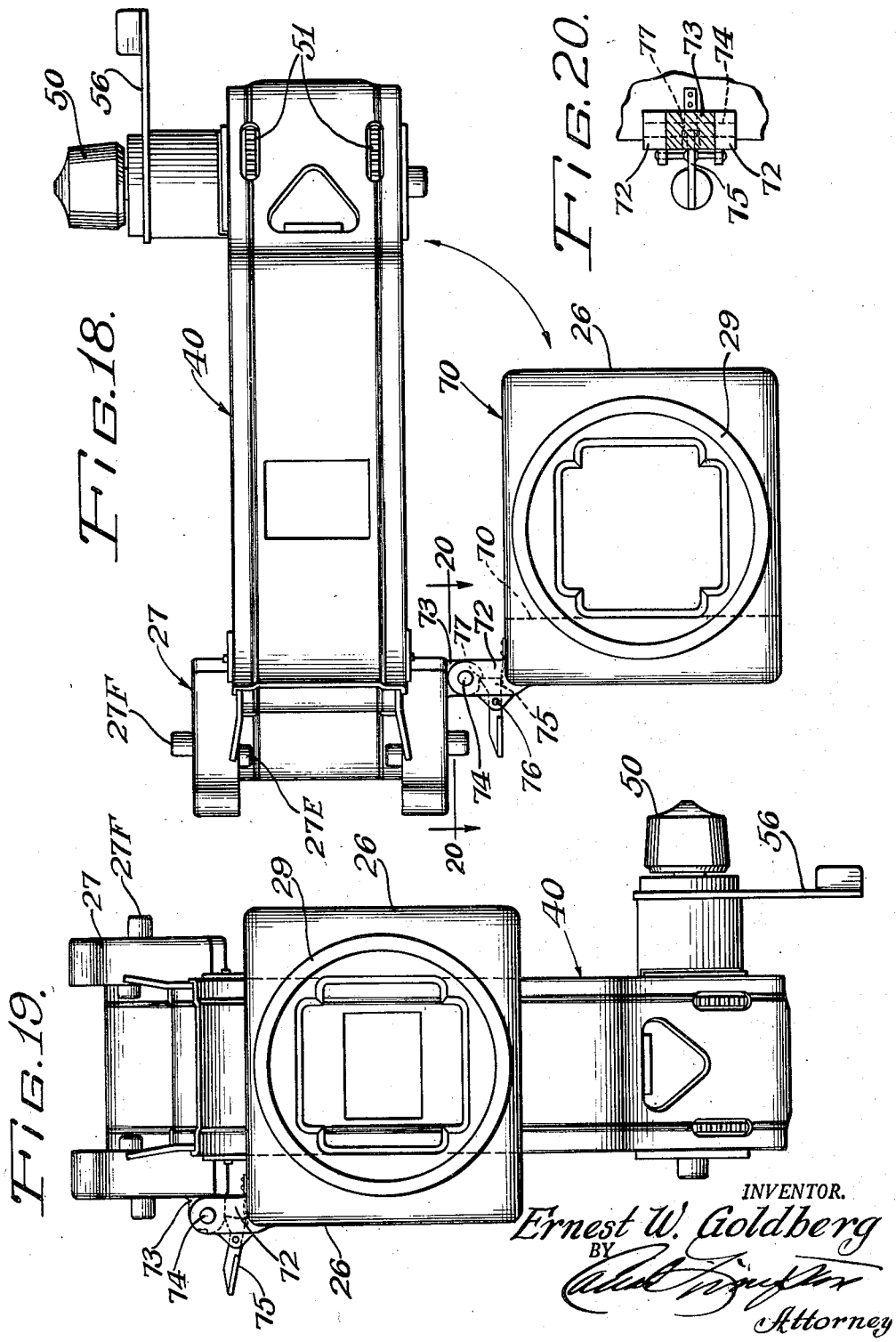

United States Patent Office 2,783,680
Patented Mar. 5, 1957

2,783,680

SLIDE AND FILM PROJECTOR WITH SWING-AWAY HEAD

Ernest W. Goldberg, Wilmette, Ill.

Application January 29, 1951, Serial No. 208,401

10 Claims. (Cl. 88—28)

The principal object of the invention disclosed is the provision, in projectors for slide and film transparencies, of a film head having a swing-away turret with film bed and track which may be rotatively swung into and out of operative position to convert the machine for projection of slides or strip-film, as desired.

Additional objects pertain to details of the construction and operation of such features as a removable film head unit; a unitary turret assembly including film bed and track structure carried by said head; a framing device which is part of the head; a turreted film track having a film carrier or bed, and a film transport and framing mechanism, as parts thereof, with a swing-away mounting including a mechanical movement effecting dual motion and register of the turret assembly on a short radius.

Another object is the provision of a combination film track, film bed, and film transport, constructed as a unit for positioning in and out of operative position in a cooperative film head.

Additional aspects of novelty and utility will become evident as the following description proceeds in view of the annexed drawings, in which:

Fig. 3 is a side elevation, to enlarged scale, of the head structure, removed from the projector, with portions of the film bed broken away;

Fig. 4 is a top plan view of the head of Fig. 3, with parts of the film bed shown in section;

Fig. 5 is a vertical longitudinal section along lines 5—5 of Fig. 4;

Fig. 6 is a vertical transverse section along lines 6—6 of Fig. 3, with the framing window open;

Fig. 7 is a horizontal transverse section through the head, with lens barrel removed, and the film track in projecting position, the view being taken along lines 7—7 of Fig. 3;

Fig. 8 is a longitudinal horizontal section similar to Fig. 7, but with the lens barrel in position and the film track in transit between film-projecting and framing positions;

Fig. 9 is a rear elevation of the film head unit with the film track in projecting position, looking outward in the direction of lines 9—9 of Fig. 3;

Fig. 10 is a front elevational detail of the removable film presser plate for the film track;

Fig. 11 is a side elevation of the plate shown in Fig. 10;

Fig. 12 is a fragmentary, vertical sectional detail taken through the turret unit including the film bed and track members, only, as they would be disposed in the head (in Fig. 5, for example);

Fig. 13 is a fragmentary, vertical sectional detail through the film-framing and transport sprocket mechanism taken at lines 13—13 of Fig. 6;

Fig. 14 is a perspective detail of the clutch collar for the framing lever;

Fig. 15 is a perspective detail of the presser spring or spider for the film-track presser plate;

Fig. 16 is a fragmentary side elevation partly in section of the head and track unit in a modified form of movable film track, bed and transport assembly;

Fig. 17 is a horizontal section of the film head shown in Fig. 16, with the film track unit removed;

Fig. 18 is a rear elevational view of a modified form of the swing-away head unit with the film unit swung into inoperative or framing position;

Fig. 19 is a view similar to Fig. 18 but showing the film unit in projecting position;

Fig. 20 is a fragmentary horizontal section of the turret latch means as viewed along lines 20—20 of Fig. 18.

Figure 1:
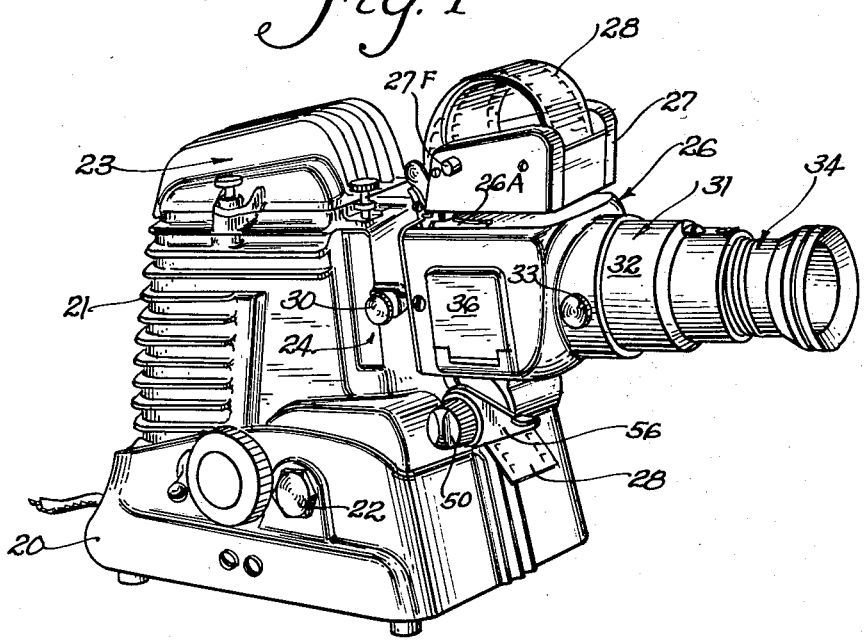
Fig. 1 is a perspective view of the new projector with the film turret swung into film-viewing position.

Referring to Fig. 1, the invention is illustrated in conjunction with a projector including an open-top base casting 20 in which is mounted a rocking lamp housing 21 pivoted on trunnion bolts 22 and having a removable dome 23 for access to the lamp and condensing lens (not shown).

A slide bed is siutated at 24, to receive a slide carrier 25 (as in Fig. 2); and flange-mounted in the slide-bed part of the housing is the film-head or turret head unit 26, having at its top a swinging film bed 27 to receive a roll of strip film 28.

The head 26 is removably mounted on the projector housing by means of a flange 29 (Fig. 3), telescoping into a bore in front of the housing, and retained by set screw 30 in alignment with the optical axis.

Telescoping into the head 26 and bore or lens mount 31 thereof is a lens barrel 32, retained by set screw 33, a projection lens assembly 34 being adjustably fitted into the barrel 32.

Figure 2:
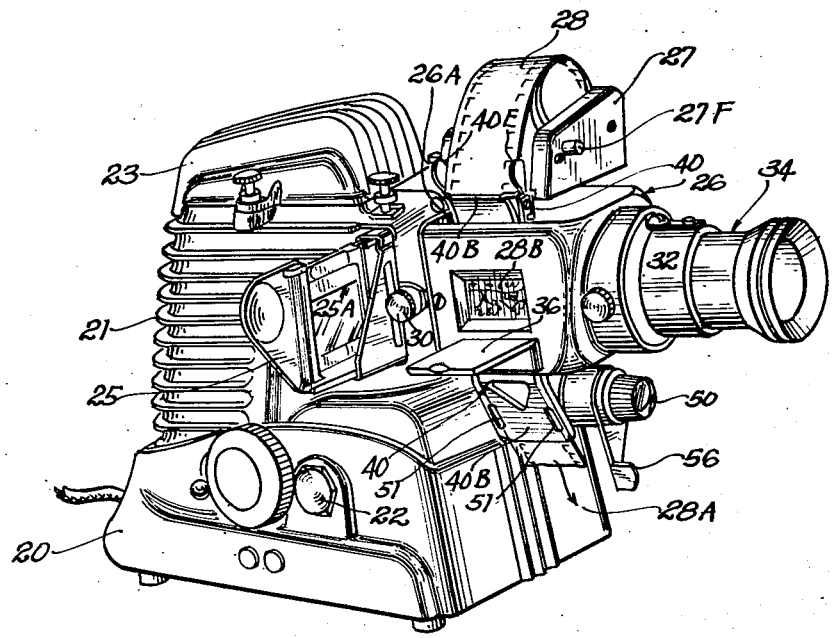
Fig. 2 shows the projector of Fig. 1 with the turret swung into framing position and/or side-projecting position.

Situated in the side of the head is a framing window 35 provided with a drop door 36 shown open in Fig. 1 and closed in Fig. 2.

The film turret and bed structure, generally designated at 27, is pivotally mounted (by means to be described) to swing 90° from the position of Fig. 1 to that shown in Fig. 2, to swing the film track in and out of alignment with the projecting axis from the lamp housing through the lens assembly.

As partly shown in Fig. 12, the film bed 27 and attached film track structure generally indicated at 40 is constructed as a unit, and it is this unit which swings, as aforesaid, there being a pair of vertically spaced trunnion arms 41 and 42 (see also Fig. 5), which are pivotally supported within the head on pivot screw 43 seated in the floor and ceiling of the chamber of the head casting.

The two trunnion arms (Figs. 5, 7, 12) and 41 and 42 are each provided with aligned elongated pivot and shifting slots 44 extending in the direction of the projection axis; and a pair of cantilever springs 45 (Figs. 5 and 7), each respectively anchored at one end on pivot studs or screws 43, and seated at their opposite ends (as at 45A, Fig. 7) in holes in the film track, urge the trunnion arms (and hence the turret and associated film track and bed parts) rearwardly, toward the left in Fig. 7, to the limit permitted by abutment of the righthand extremities of slots 44 against their respective pivot screws 43.

The aforesaid trunnion, pivot-stud, or screw, slot and spring mechanism 41, 42, 43, 44, 45, constitutes a special mechanism providing dual or compound displacement or shifting of the film bed and track assembly 27, 40, on a short radius within the body of the head, so that the film track will be accurately and firmly disposed in proper register in either of its two stations.

To permit the turret (particularly the track channel) to swing as aforesaid, the floor and ceiling walls of the head casting are cut away as at 26A (Figs 1, 2, 5, and 6).

The film track, generally indicated at 40, consists essentially of an elongated channel plate 40A (Figs. 7 and 12) having an outwardly curved lip 40B (Fig. 12), at its upper end, and a forwardly and downwardly directed apron 40C (Figs. 5 and 13) at its lower end (the apron is omitted from Fig. 12 for lack of space), which apron guides the film as it emerges from the bottom of the track. In its mid-region the channel has a window 40X.

Removably fitted into the film track is an elongated presser plate 40D (Figs. 9, 10, 11, particularly), having a pair of grasping tangs 40E at its upper end, a window 40F in its mid-region, and a curved apron 40G at its lower end, corresponding in function to apron portion 40C of the track channel.

By grasping the tangs 40E and working pins 40H (Figs. 10, 11) out of the slots 40J in the track unit (Fig. 12), the presser plate may be elevated and removed, or dropped into the track. A spring spider or presser 48 (Fig. 15) is mounted inside the track 40, as in Fig. 5 to frictionally urge the presser plate 40D against any film in the track.

Framing and transport means are provided as a part of the turret head assembly to move therewith, such means including, as first viewed in Fig. 2, a knob 50 turnable to drive a pair of sprocket wheels 51 which engage the film perforations to transport the film 28 in either direction—mainly downward.

A framing lever 56 (Figs. 2, 6, 9) is mounted coaxially with knob 50 on a spindle 52 which is fast with sprockets 51, so that turning of the knob will rotate the sprockets and transport the film.

Framing lever 56, however, has only limited oscillatory freedom, it being keyed (as at 56A, Fig. 6) to a shoulder on a clutch collar 57 (shown in perspective in Fig. 14), which floats free on shaft 52, but which is fast by set screws with the threaded nipple 58 of a clutch disc 59 provided with a ball and spring clicker 60, which clicks home to signal transport of one film frame each quarter-turn of knob 50.

A spring spider 61 in the cavity of the clutch collar gives a frictional braking action on the lever mechanism; and a small stopping stud 62 (Figs. 13 and 14) on the clutch collar, abutting at stop margins 63 on the sprocket-mounting cradle bracket 64, limits the throw of the lever 56. The sprocket cradle 64 is a U-shaped metal strap and is secured as by screws 65 (Fig. 13) to offsets on the lower track-channel apron portion 40B.

The entire turret assembly, consisting of the film bed 27, the track structure 40, etc., and the film transport and framing mechanism is contrived as a unitary structure, and is of great importance to the utility of the machine to facilitate projection of slides or film without the annoyance of dismantling or installing auxiliary attachments for the purpose.

Moreover, the film bed itself is of an improved structure with respect to the provision of a simple pressure-operated guarding or spindle-stud means for preventing the escape of the roll of film 28 from the bed.

Referring now to Fig. 5, the film bed consists of a curved plate 27A which terminates in the opposite offset ears 27B (Fig. 12) in which the presser plate locking slots 40J are formed, and these ears are attached as by screws 27C to the film track channel plate 40.

As viewed in Figs 4 and 6, the curved bed plate 27A has opposite side walls 27AX, on each of which is pivotally mounted a button-operated lever 27D having at one end a film-retaining spindle stud 27E projecting through the aforesaid sidewalls in alignment with the companion stud 27E on the opposite lever, so that, in effect, the two studs 27E afford stub spindles projecting far enough into the roll of film 28 to prevent the latter from escaping the bed, while permitting the film to unwind freely.

The opposite ends of the presser levers 27D (Fig. 4) are provided with buttons 27F projecting outwardly through face plates 27G secured to the side plate portions. Each lever also has a normalizing spring 27H (Fig. 6) which homes the lever so that the spindle studs 27E are normally projected inwardly of the bed, as in Fig. 4.

By pressing the two buttons 27F inwardly the spindle studs 27E are retracted to admit a roll of film to the bed; and when released or normalized these studs constitute in effect the opposite ends of a spindle about which the roll unwinds.

A modified form of construction of the head is shown in Fig. 16, wherein the film unit consisting again of the bed means 27, the track means 40, and the attached transport means 50—51—56, instead of being pivotally movable on the head 26, is mounted to slide sidewise into and out of the head, in which there is provided for this purpose a side-opening slot generally indicated at 70 in Fig. 17, there being a pair of horizontally extensive track ribs 71 (Figs. 16 and 17) cast in the head along the top and bottom margins of said slot to seat the upper and lower transverse margins or edges 40C of the track channel assembly.

In this form of the device, the film unit is removed entirely from the head when slides are to be projected, the roll of film, if any, in bed 27 being held by the spindle stud means 27E heretofore described.

Another modified form of head and film turret structure is shown in Fig. 18 wherein the movable film unit is identical to the construction heretofore described, insofar as it includes the film bed means 27, the film track structure 40, and its associated transport means 50—51—56, the head 26 being in the form shown in Figs. 16 and 17 in that the same type of side-opening slot 70 is provided to accommodate movements of the film unit into and out of projecting position.

However, in the construction of Fig. 18, there is only one pivotal attachment for the turret, there being boss formations 72 provided on the head casting and a complementary boss formation 73 on track unit 40 associated therewith by a pintle or pin 74, such that the turret or film unit can be swung from the non-projecting or framing position of Fig. 18, fully into the head slot and into the projecting position of Fig. 19.

Latch means for automatically holding the turret unit of Fig. 18 in inoperative or raised position includes a spring latch pawl 75, pivoted as at 76 (Figs. 18 and 19) to engage in a notch 77 (Figs. 18 and 20) in the boss 73 when the head is fully raised.

*Operation*

For the projection of strip-film transparencies, the turret is desirably first turned into the position shown in Fig. 2. A roll of film 28 is seated in the bed 27 following pressing of finger buttons 27F to retract the spindle studs, and thereafter the presser plate is withdrawn by grasping the fingers tangs 40E and pulling the plate upwardly out of the track, so that the leading end 28A of the film may be easily threaded down into the track to engage the sprockets 51, the presser plate thereafter being reinserted and locked in the track.

To frame the picture or film, the door 36 is opened, as in Fig. 2, exposing one frame 28B of the film, which may be moved up or down, for centering or framing, by rocking the framing lever 56 back and forth (actuating sprockets 51, as explained).

Having framed the view, the door 36 is closed and the turret is swung into the film-projecting position shown in Fig. 1; this is most conveniently done by grasping the opposite face plates of the film bed between the fingers of one hand and turning the turret home.

The film head 26 affords a chamber or cubicle in which the turret structure and particularly the track section is swingably or pivotally mounted for its dual or compound motion on the dual-displacement pivot means 42, 43, 44, 45, which permits the interiorly situated track or turret parts to shift radially while pivoting.

In this action, the track section rides against an inside wall portion of the head chamber, being urged against said wall portion by action of the springs 45, as in Fig. 7, the aforesaid riding contact between wall and track being indicated at C in Fig. 8. This device reduces the size of the head and permits of the configuration of the head shown, with flat, rectangularly related side walls, so that the track window may be closely pressed and registered against the projection window or the frame window in its two positions.

Assuming proper focal adjustment of the lens means and energization of the light source, the film-pictures will be projected one after another responsive to turning of knob 50. Lever 56 may also be manipulated in the film-projecting position to adjust the framing.

When it is desired to project slide transparencies, the turret is turned again into the position of Fig. 2 (preferably, but not necessarily, provided the film strip is withdrawn), and the slide carrier 25, e. g. carrying slides 25A, is manipulated in the usual manner with suitable adjustment of focus.

The head asembly 26 forms a compact unit which may be removed by loosening set screw 30, Fig. 2, and the construction is such that the swing-away turret head may replace the old style heads on machines having a suitable mounting seat to receive the collar 29 (Fig. 5). Moreover, the head constitutes a lens mount as well as a means for mounting the swinging film track relative to the lens tubes and an off-axis framing position and window.

The several advantages of the present swing-away turret, and its structural and functional features, will be manifest to users of this type of equipment, it being unnecessary to disturb the strip film in its bed in order to change over to slide projection; and it being unnecessary to remove the strip-film bed or track from the projector, or to attach or install any accessory equipment to change from slide to film projection.

The entire head structure is simple and rugged, yet retains all of the advantages of transport, framing, and viewing or monitoring, afforded by projectors adapted exclusively to the showing of strip film transparencies.

I claim:

1. In a projector, a swing-away film turret structure comprising a chambered head on the projector, projecting-lens means carried by said head, a film track pivoted to turn in the chambered part of the head to swing into and out of optical alignment with said lens means, that is to say, into projection and non-projection positions, a film bed movable with said track and disposed exteriorly of said head, a window in said head and disposed on a side thereof displaced angularly away from the projection axis through said lens means, said track in non-projecting position as aforesaid being disposed in juxtaposition with said window to register a section of film therein with said window for alignment purposes.

2. In a projector, a swing-away film turret assembly including a head in the form of a closed chamber assembled with the projector, a film track and means pivotally mounting the same on the head with substantial portions of the track in the chamber for movement into an out of projecting position in said head, a film bed disposed externally of said head and movable with said track, and film-moving mechanism carried by said track for movement therewith, the pivotal axis for said track being located so as to be included in the field of projection.

3. Apparatus as set forth in claim 2 and further characterized in that said film bed has a bottom and opposite flanking sidewall defining a cavity to receive a roll of film, and said opposite walls are each provided with complementary aligned spindle studs, each spring-urged to project normally into said cavity and into the center of a roll of film in the bed to retain the roll therein, together with detent mechanism cooperative with each said stud and each depressable to effect retraction of the corresponding stud from the cavity a distance to permit removal or insertion of a film roll.

4. The combination, with a slide projector having a housing with a slide bed in alignment with a source of projecting light in the housing, of film projection means comprising, to wit: a lens mount adapted for optical alignment with said slide bed and light source, means on said housing cooperable with means on said mount for removably supporting the mount in alignment with the slide bed as aforesaid, said mount having slot formations in the top, bottom, and at least one adjoining side wall portion of the mount to receive a film track and permit displacement of the track into and out of a position of optical alignment before said slide bed, an elongated channel plate structure constituting a film track, pivot means joining said track to said mount for movement into and out of slot formations for alignment as aforesaid, said track having attached thereto at its upper extremity a film bed projecting forwardly of said slide bed and overlying said lens mount to feed a film from a roll carried in said film bed downwardly into the channel of said track, and a film transporting sprocket mechanism carried by said channel plate structure at its lower end forwardly beneath said lens mount for moving the film up and down in said track.

5. Projection apparatus according to claim 4 and further characterized by the provision of a framing window in said adjoining sidewall of the mount, and location of the pivotal axis for said track to position the latter with respect to said window so that the film in the track is aligned and visible when the track is moved a predetermined amount out of alignment as aforesaid.

6. The structure of claim 5 further characterized by the provision of a closure pivotally mounted on said adjoining wall of the mount for said framing window therein for exposing or covering the window.

7. In a projector having a slide bed, a swing-away film-carrying structure comprising a cubicle and means mounting the same in front of said bed, said cubicle having light-projection passages aligned in opposite walls with the projection axis through said bed, a film track projecting through said cubicle, means pivotally mounting said track on said cubicle for compound angular and linear movement to provide a short turning radius for the track in a range of movement from a projection position in alignment with said projection passages, to a non-obstructing position confronting an intervening wall of said cubicle which adjoins the walls in which said aligned projection passages are situated.

8. The structure of claim 7 further characterized in that said adjoining wall of the cubicle has a framing window located to confront said film track when the latter is moved therebefore in non-obstructing position as aforesaid.

9. The structure of claim 7 further characterized in that said cubicle includes lens mounting means in alignment with said projection passages.

10. Film track structure including an elongated channel member for guiding a length of film, a film bed attached to one end region of said channel member to project outwardly therefrom and lie in a plane at an angle to the plane of the channel member, said bed including walls defining a cavity to seat a roll of film, said bed having at least one stud member mounted for projection and retraction in a wall portion thereof flanking said cavity to engage in the open core of a roll of film in said cavity, to prevent dislodgement of the roll therefrom, and means carried by said bed for moving said stud into and out of projecting and retracted positions.

References Cited in the file of this patent

UNITED STATES PATENTS

| 1,433,475 | Porter | Oct. 24, 1922 |
| 1,552,604 | Hoberdier et al. | Sept. 8, 1925 |
| 1,738,762 | De Vault | Dec. 10, 1929 |

(Other references on following page)

UNITED STATES PATENTS

| | | |
|---|---|---|
| 1,759,391 | Citron | May 20, 1930 |
| 1,956,418 | Flinker | Apr. 24, 1934 |
| 2,113,845 | Kleerup | Apr. 12, 1938 |
| 2,174,660 | Hirsch | Oct. 3, 1939 |
| 2,204,884 | Brenkert | June 18, 1940 |
| 2,243,160 | Koehl | May 27, 1941 |
| 2,251,077 | Stanton | July 29, 1941 |
| 2,285,915 | Dutton | June 9, 1942 |
| 2,303,633 | Guercio | Dec. 1, 1942 |
| 2,330,709 | Harper | Sept. 28, 1943 |
| 2,512,314 | Dutton | June 20, 1950 |